United States Patent [19]

Mathivat et al.

[11] Patent Number: 5,026,414
[45] Date of Patent: Jun. 25, 1991

[54] HIGH-CAPACITY PROCESS FOR BENDING GLASS PLATES INTO CONVEX SHAPE

[75] Inventors: Denis Mathivat, Thourotte; Daniel Colmon, Franconville; Daniel Philibert, Thourotte, all of France

[73] Assignee: Saint-Gobain Vitrage, Courbevoie, France

[21] Appl. No.: 465,508

[22] Filed: Jan. 16, 1990

Related U.S. Application Data

[63] Continuation of Ser. No. 117,513, Nov. 6, 1987.

[30] Foreign Application Priority Data

Nov. 6, 1986 [FR] France .................. 86 15489

[51] Int. Cl.$^5$ .......................................... C03B 23/023
[52] U.S. Cl. ........................................ 65/106; 65/107
[58] Field of Search ............... 65/106, 107, 104, 114, 65/273, 351, 287

[56] References Cited

U.S. PATENT DOCUMENTS 4,682,997  7/1987  Halberschmidt et al. ............ 65/106
4,753,668  6/1988  Honjo et al. .......................... 65/273

Primary Examiner—Joye L. Woodard
Attorney, Agent, or Firm—Oblon, Spivak, McClelland, Maier & Neustadt

[57] ABSTRACT

A plurality of glass plates are positioned under upper units capable of bending and/or transferring those plates, the pick up and release of each plate being independent of each other. The plates are bent either on the upper station, or on a lower unit onto which they are released from the upper station. The plates are subsequently subjected to tempering. Mass production of tempered glass plates at both high quality and high output levels is thus achieved.

4 Claims, 3 Drawing Sheets

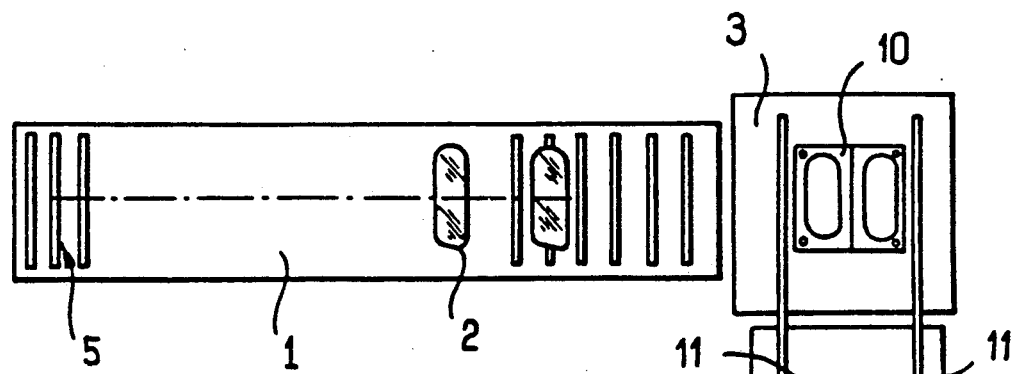
FIG_1
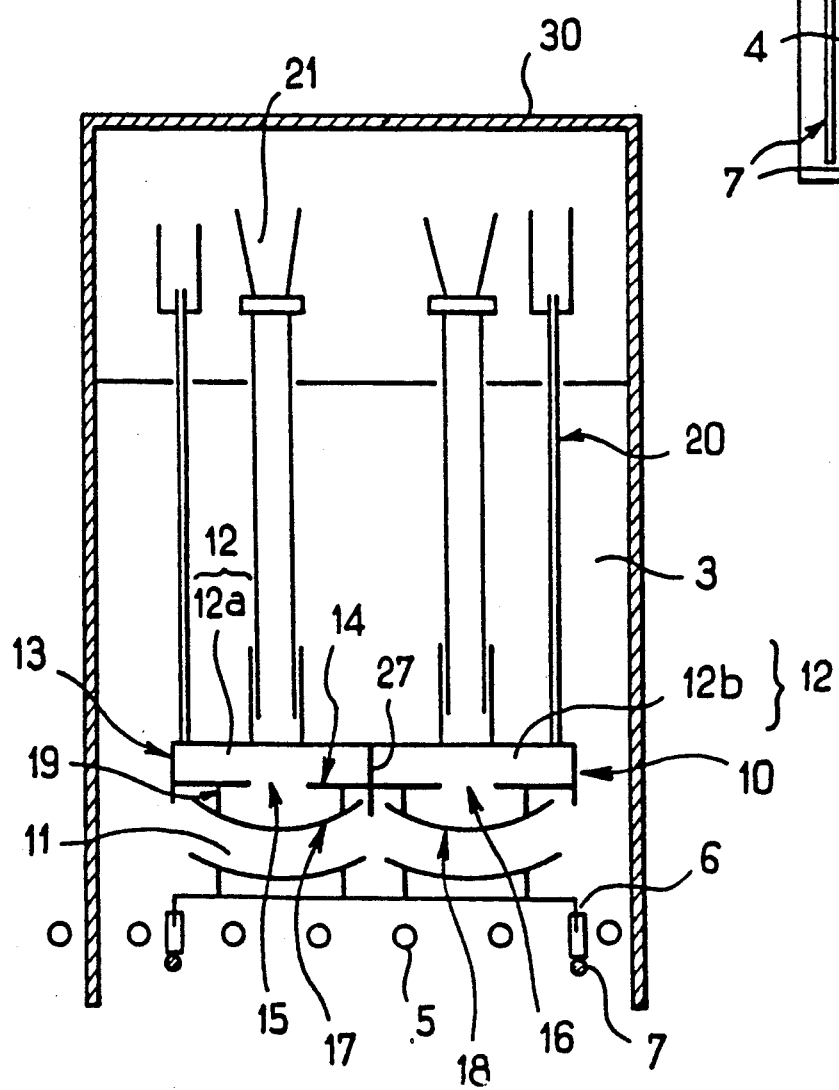
FIG_2

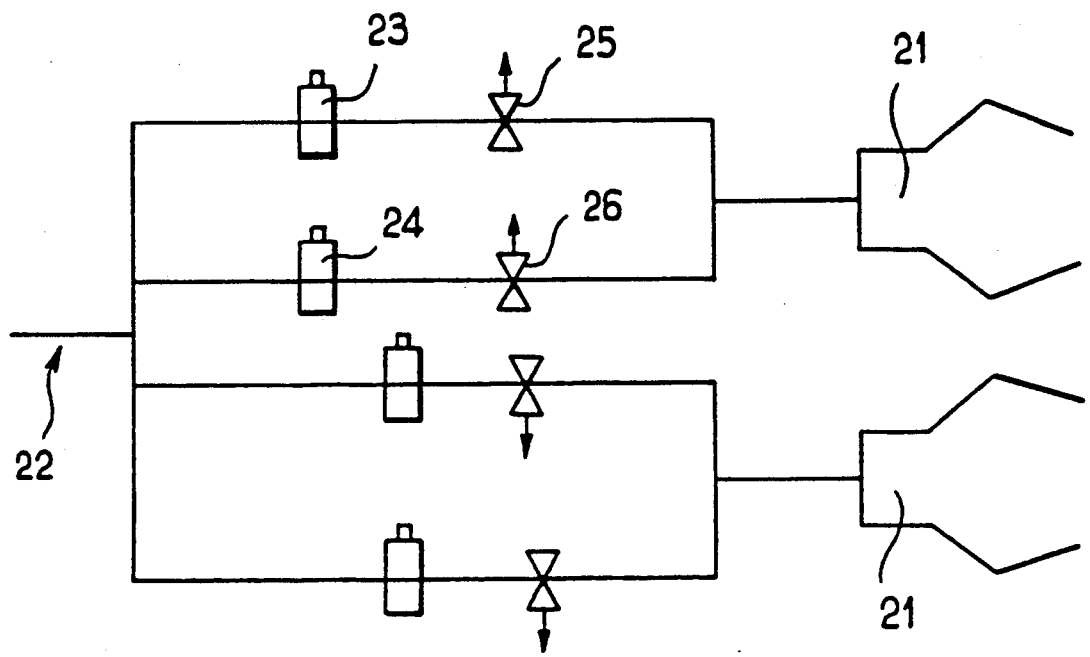
FIG_3
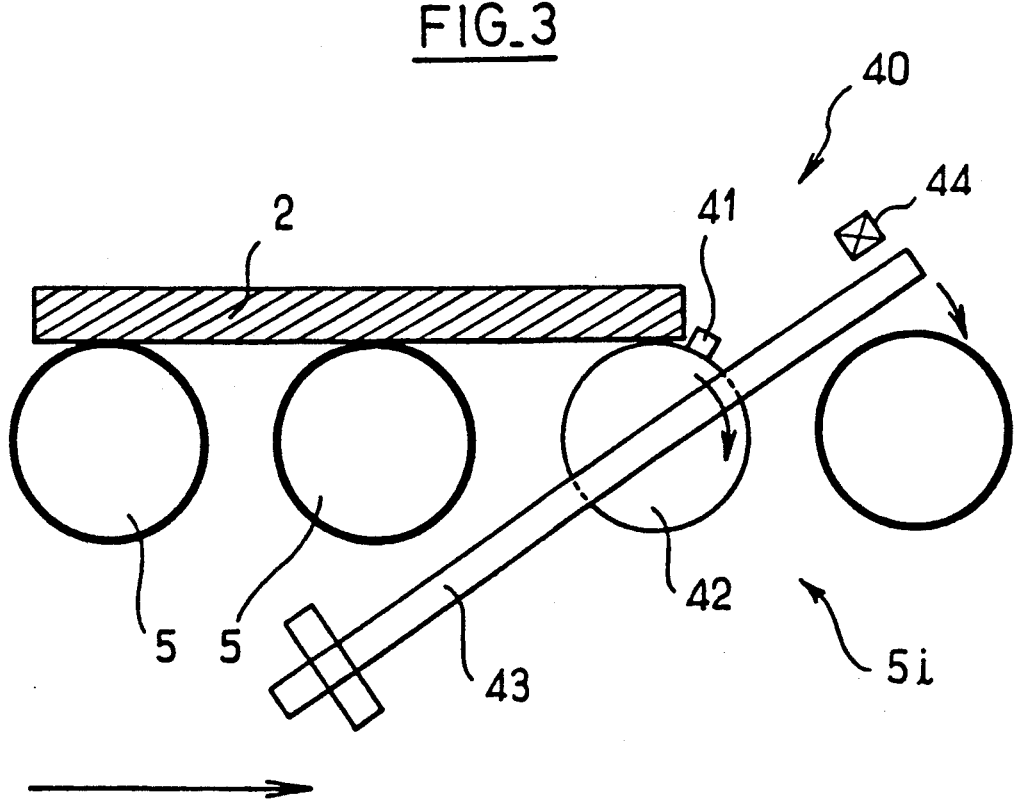
FIG_4

HIGH-CAPACITY PROCESS FOR BENDING GLASS PLATES INTO CONVEX SHAPE

This is a continuation of application Ser. No. 07/117,513, filed on Nov. 6, 1987.

BACKGROUND OF THE INVENTION

1. Field of the Invention

The invention concerns the bending of glass plates into convex shape in a high-capacity bending (hereinafter, bending of a glass plate to assume a convex shape will be referred to by the term "convexing") installation, entailing a possibility of simultaneous convexing of several glass plates, that installation being of the type in which a glass plate is brought to its convexing temperature, carried over a conveyor, stopped under an upper transfer and/or convexing unit, picked up by that upper unit and then released on a lower discharge and/or convexing unit after said plate is applied against the upper transfer and/or convexing unit.

2. Background of the Prior Art

It is known from French patent documents 7014794, published under No. 2085464, 8604962 and 8411148, published under No. 2567508, how to use upper units capable of treating one glass plate at a time.

However, in order to increase production capacities when the convexed sheet glass manufactured is of small size, it is advantageous to bend several glass plates into convex shape simultaneously.

If the glass plates to be simultaneously treated are supplied on the conveyor arranged beside each other and the different stations available on a same upper unit are juxtaposed crosswise to the direction of feed of the conveyor, everything happens in the synchronization of operations, as in the case of a single glass plate. The different glass plates follow two exactly identical parallel paths and they must then undergo strictly identical convexing treatments.

That implies that the glass plates retain exactly identical relative positions all along their path; now, that can be difficult to obtain and it is impossible to correct the position of just one glass plate without altering the position of the other, insofar as they are all on one and the same conveyor.

In another connection, it was previously proposed in European patent applications 67509 and 103421 that two convexing locations be juxtaposed on the same upper unit, one after the other in the longitudinal direction of feed of the conveyor. But the placement of the glass plates under each convexing location demands complicated means of delivery, so as to organize a correction of the delay of the glass plate the farthest up in relation to the one farthest down, thanks to detection systems, and means of logic, of independent conveyors. Thus, for each glass plate a new path and new speeds are to be defined. Furthermore, in spite of those complex means employed, there is no certainty of perfect positioning of the two glass plates at the end of travel under the upper unit, for, on the one hand, the detection of the glass plates is carried out at a relatively long distance from that end of travel and deviations and all kinds of disturbances can occur until the end of travel and, on the other, the optical detections, as proposed, are inaccurate at the high temperatures prevailing in the convexing installations.

Simplification of the system would lead to convexing glass plates possibly arriving at different instants under their convexing location, having followed different paths, the glass plates therefore being in different thermal states, thus resulting in convexing differences for those glass plates.

SUMMARY OF THE INVENTION

The present invention is aimed at solving those problems associated with the possibility that the glass plates might slide during their travel and, therefore, not retain strictly identical relative positions, and with the difficulty of juxtaposing two convexing stations in the longitudinal direction, owing to the impossibility of positioning separately with precision and with simple means glass plates which follow each other and the impossibility of guaranteeing identical thermal conditions for glass plates arriving at different final positions under a same upper unit, possibly at different times.

It is aimed at making possible, in the course of the same cycle, the convexing of glass plates which, though delivered one after the other on the same conveyor, are individually positioned opposite their respective convexing and/or transfer stations, and which, though having different thermal states owing to their sequence in the longitudinal direction, are treated by one and the same upper unit.

The invention proposes for that purpose a convexing process in which, on each cycle, multiple glass plates that are to be bent into convex shape are delivered one after another by the same conveyor on sections of said conveyor, which follow each other in the direction of said conveyor and which, at least in part, are arranged under the multiple convexing and/or transfer stations of one and the same upper unit following each other longitudinally, are picked up by the upper unit, are then released by that upper unit independent of each other, at times which can differ from each other, on lower discharge and/or convexing units having meanwhile entered under the different stations of the upper unit, and are finally discharged.

The discharge of the sheet glass bent into convex shape takes place laterally.

The invention also proposes a convexing installation including a reheating furnace, a convexing or shaping cell with several stations which follow each other lengthwise, carried by the same upper unit, a conveyor with several separable sections that follow each other in the longitudinal direction, which is its direction of feed, crossing the furnace and carrying the glass plates into the convexing cell, and at least one lower discharge and/or convexing unit, on which the glass plates are released after they have been grabbed by the upper unit and/or applied against it and the lower unit and/or units have become available under the glass plates, that installation being such that each convexing and/or transfer station possesses its own means of vacuum retention of a glass plate.

BRIEF DESCRIPTION OF THE DRAWINGS

The invention will now be described in greater detail with reference to the attached figures, which represent the following:

FIG. 1 is a general view of the convexing and tempering installation according to the invention;

FIG. 2 is a schematic view of a convexing unit with several stations in a convexing cell;

FIG. 3 is a schematic view of the suction means and their supply circuit;

FIG. 4 is a detailed view of one of the means of positioning and stopping the glass plates under their respective convexing and/or transfer stations or locations;

DETAILED DESCRIPTION OF THE INVENTION

Figure 5:
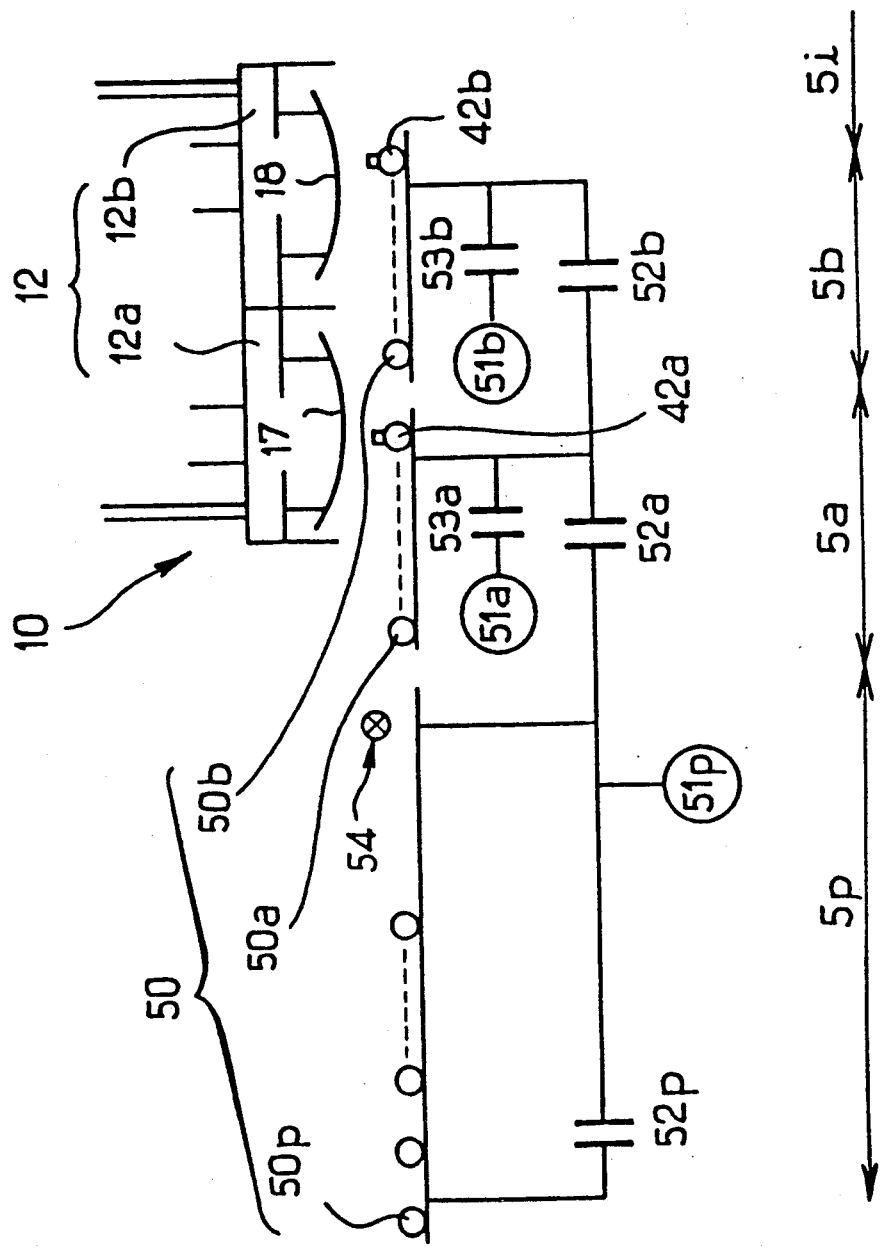
FIG. 5 is a schematic general view of the conveyor with several sections.

The installation shown on FIG. 1 comprises a reheating furnace 1 for glass plates such as 2, a convexing cell 3, a tempering station 4, a conveyor 5 for delivery of the glass plates to the convexing cell 3, the conveyer crossing the furnace 1, and means for discharging the convexed glass plates 2 from the convexing cell 3 to the tempering station 4.

The plate glass reheating furnace 1 is, for example, of the type described in the French patent document filed under No. 86.05057.

The delivery conveyor 5 is, for example, a conveyor with rollers advantageously covered with a sheath of braided or knit silica or glass fibers.

The means for discharging the convexed glass plates consist of carriages 6 moving on rails 7, those carriages being capable of holding the glass without deformation before undergoing tempering. They are, for example, frames with open curved sections in the center.

The convexing cell 3 contains an upper transfer and/or convexing unit 10 placed above the conveyor 5 and at least one lower discharge and/or convexing unit 11 capable of being placed under the upper unit 10 in order to receive the glass plate or plates released by the latter.

In some cases, the upper unit is a simple transfer unit: the glass plates arriving on the delivery conveyor 5 are picked up by that upper unit 10 so as to clear the conveyor and thus enable a lower convexing unit 11 to be set in place under the glass plates. The glass plates are then released by the upper transfer unit 10 and received by the lower convexing unit 11, whose shape they adopt. A lower convexing unit 11 is, for example, a frame with curved section, open in the center, mounted on a carriage, as indicated above, that carriage being usable also to discharge the convexed glass plate for tempering.

In other cases, the upper unit 10 is both a transfer and convexing unit; that is, a glass plate applied against it to clear the delivery conveyor 5 and thus permit entry of a lower convexing unit 11, such as a convexing frame with curved section open in the center, mounted on a carriage, acquires a preliminary convex shape by exactly or approximately adopting the curved shape of that upper unit 10.

In other cases, the upper unit 10 is essentially a convexing unit, and the lower unit 11 is solely a discharge unit; that is, a glass plate applied against that curved upper unit 10 acquires all of its permanent convexing on contact with said upper unit and it is deposited on the lower unit 11 only in order to be removed to the following work station, generally a tempering station. Even in that case, the lower discharge unit advantageously has a curved shape, identical to the shape acquired by the glass plate, so as to be able to carry it without deformation to the following work station, notably, to the tempering station. It is thus, for example, a frame with curved section open in the center.

Such a convexing process in these cases is, for example, described in the French patent document published under No. 2,567,508 and already mentioned.

The upper convexing and/or transfer unit 10 is, for example, of the type described in the aforementioned French patent documents 86 04962 and 86 04774. It thus comprises, as shown on FIG. 2, a box 12 whose side parts 13 form a skirt around a base plate 14. That base plate 14 is drilled with several holes, e.g., two 15 and 16, juxtaposed in the longitudinal direction of the installation, of dimensions close to those of the glass plates to be treated, these holes being equipped at a level slightly lower than that of the base plate 14 (a few millimeters, particularly between 1 and 10 mm and, for example, around 3 mm) with two units 17 and 18 bearing the glass plates to be bent into convex shape, those bearing units being joined to the base plate 14 by fastenings 19.

Box 12 and its accessories, base plate 14 and bearing units 17 and 18, are mounted so as to be capable of having an ascending or descending motion. The box is thus borne by four jacks such as 20. Those different motions are controlled through a robot with line card system, which, in particular, makes possible any correction in positioning of the assembly formed by the box 12 and its accessories, in relation to the glass plates put under it, on the conveyor 5, in order to take into account, notably, imprecisions or variations in positioning due, in particular, to the heat prevailing at the convexing station.

Insofar as the glass plates are picked up by that upper convexing and/or transfer unit, thanks to a vacuum exerted across that unit or on its periphery, this box 12, as stated in the aforementioned previous patent documents, is connected to suction means, notably, suction pumps such as 21 (FIG. 3), preferably fed with hot air collected, for example, by pipes 22 in the furnace 1. Those suction means shown on FIG. 3, such as pumps 21, are each fed by a circuit containing in parallel two means 23, 24 of pressure regulation and two electric valves 25, 26 robot-controlled, one of the means of pressure regulation, e.g., 23, connected to electric valve 25, being regulated for a relatively high pressure difference, which makes it possible to exert at base plate 14 a high vacuum in order to lift the glass plates and pick them up, the other, e.g., 24, connected to electric valve 26, being regulated for a relatively low pressure, which makes it possible to exert at base plate 14 a weaker vacuum in order just to keep the glass plates applied against the bearing plates 17, 18 of the upper unit 10.

According to the invention, the box 12 is divided into as many chambers as there are convexing and/or transfer locations provided in the upper unit 10. Thus, insofar as two locations are set aside, corresponding to two bearing units 17 and 18, a partition is provided in the box 12, limiting two chambers 12 a and 12 b, each in relation to a convexing and/or transfer location. Of course, a greater number of chambers such as 12 a or 12 b, each in relation to a convexing and/or transfer location and to a bearing unit such as 17 or 18, is also possible, as, for example, three chambers 12 a, 12 b, connected to independent suction means. Each chamber, such as 12 a and 12 b, is then fed by its own suction means.

Box 12 and its accessories, as well as the vacuum production means, are placed inside a sealed chamber 30 kept at high temperature by heating means not represented on the figures, notably, electric resistors lining the insulated walls of said chamber 30. Those heating means are also advantageously placed on the floor of that chamber and, preferably, they are distributed in different zones not represented on the drawings, separately controllable, each placed under a convexing location.

Insofar as several convexing locations follow each other longitudinally, the result is a sequence of longitudinally separated heating zones.

Insofar as convexing locations are also juxtaposed crosswise, the result is a multiple number of heating zones arranged in a check pattern.

In case the heating means placed on the floor are not distributed in distinct zones, a differentiation in heating, according to the areas corresponding to the convexing locations, is also possible by inserting between those heating means and the glass plates screens which can differ from one area to another.

In the chamber 30 the glass plates are brought in and out through doors raised by chains wound on motor-driven pulleys, the motor being relieved by counter-weights connected to each pulley. Those units for raising the doors are standard and not represented on the figures.

The glass plates 2 to be bent into convex shape are then brought under the upper unit 10 and, more specifically, under the bearing units 17 and 18 belonging to several convexing and/or transfer stations or locations of the same upper unit by the conveyor under general reference 5.

To make possible the precise positioning of several glass plates 2 following each other on the same conveyor 5 under the bearing units, such as 17 or 18, of several convexing and/or transfer locations juxtaposed in the longitudinal direction of the installation, this conveyor 5 possesses several successive sections 5a, 5b, - - -, 5i, - - -, which can be rendered independent of each other, in a number at least equal to the number of convexing and/or transfer locations provided in the same upper unit 10, which follow each other lengthwise.

Thus, insofar as it is arranged to treat two glass plates 2 simultaneously, two longitudinally juxtaposed locations are provided and the conveyor 5 includes at least two sections 5a and 5b which each follow each other and end under a convexing and/or transfer location. Those different sections 5i contain their own means of positioning of the glass plates, consisting preferably of a positioning system, such as that already known, described in French patent application 85.13801. That system, under reference 40, shown schematically on FIG. 4, is formed by at least one detecting finger 41 projecting above the plane of the conveyor 5 along which the glass plates are carried. That finger 41 is borne by a rod 42 parallel to the rollers of the conveyor and, in a preferred version, it is an idle roller of the conveyor, of diameter slightly less than that of the standard rollers of the conveyor.

When the front edge of a glass plate encounters a finger 41, it pushes it back and at the same time starts the rotation of the rod or roller 42, which has the effect of retracting the finger 41 and freeing the passage for the glass plate. However, one of the ends of the rod or roller 42 is integral with a lever arm 43 which, when the finger 41 is in active position above the conveyor 5, rests on a proximity detector or microcontact 44. At the time the finger 41 is touched by the glass plate, its position in the direction of feed of the conveyor is precisely determined and the stop of the conveyor is controlled with a more or less long delay after that contact with the finger 41, concomitant with the separation of the lever arm from the microcontact 44.

Such a system 40 then equips each section 5i of the conveyor 5. A conveyor 5 with two sections 5a and 5b intended to bring glass plates under an upper unit 10 with two convexing locations juxtaposed in the longitudinal direction of the installation is shown schematically on FIG. 5.

It consists of rollers 50, some 50p belonging to the main conveyor 5p and being placed up to the mouth of the furnace 1, those under reference 50a belonging to the section 5a ending under the convexing location farthest up the line and those under reference 50b belonging to the section 5b ending under the convexing location farthest down the line.

Each of those portions 5p, 5a, 5b is capable of being driven by its motor 51p for 5p, 51a and 51b respectively for sections 5a and 5b. However, in order to allow groupings of all or part of those sections 5p, 5a, 5b and their drive at the same speed or, on the other hand, to permit their separation and their operation under different conditions, gears 52p, 52a and 52b are provided on the standard drive systems meshing on the roller end pinions of those conveyor sections. When 52p, 52a and 52b are engaged, but 53a and 53 b, on the other hand, are disengaged, all the rollers turn at the same speed, driven by the same motor 51p.

When 52a and 52b are disengaged, but 53a and 53b are engaged, the motor 51p no longer acts on sections 5a and 5b of the general conveyor 5; those sections can be driven by their respective motor 51a, 51b, if their associated gear 53a, 53b is engaged.

Each section 5a, 5b is equipped with a positioning system 40 with detecting finger; the rollers or rods 42a and 42b bearing the detecting finger are represented on FIG. 5 alone.

That conveying assembly 5 is also equipped with a cell 54 for detection of the front edge of the glass plates at the mouth of the furnace 1.

The conveyor 5 assembly is driven by the motor 51p, 52a and 52b being engaged and 53a and 53b being disengaged, when a glass plate advances inside the furnace 1. When its front edge is detected by the cell 54 and a certain adjustable time has elapsed to permit the rise of the entire glass plate on section 5b of the conveyor, 52b is disengaged and 53b is engaged in order to permit the drive of section 5b by the motor 51b. Section 5b is preferably driven at the same speed as the general conveyor. The glass plate on that section 5b advances, encounters the detecting finger connected to a roller or a rod 42b, undertakes its stop procedure and then stops in the desired position under its convexing location. During that time, a second glass plate has advanced in the furnace 1, its front edge has been intercepted by the cell 54 and, after a given delay for the whole second glass plate to be on section 5a, 52 a is disengaged and 53a engaged, thus enabling that second glass plate to progress on section 5a of the conveyor, preferably at the same speed as previously. However, bearing in mind that each section is independent of the others and possesses its own means of positioning, it is also possible that the speed of each section will be different from that of the main conveyor and/or from that of the other sections. That second glass plate intercepts the finger 41 of roller 42a, which causes it to stop after the stop procedures already described in the text of the above-mentioned patent FR 85 13801. The glass plates in place under their respective convexing locations can receive additional heating thanks to the heating means equipping the chamber 30 and that additional heating can be different from one plate to the other, thanks, in particular, to the heating means on the floor of the chamber, distributed in different zones or equipped with possibly different screens.

To simplify the explanations, only one upper unit 10 with two convexing and/or transfer stations connected to a conveyor with two auxiliary sections 5a and 5b has been described.

However, a larger number of stations is possible and it is sufficient to add another section and possibly others to the conveyor 5, that (or those) additional section(s) being equipped with its (their) own means of positioning of the glass plates. Those sections follow each other lengthwise, but it is also possible to provide juxtaposed sections crosswise. Those systems make it possible to attain a positioning precision of the glass ceilings in the order of 1/10 mm to 5/10 mm.

Those operations of arrival, positioning and stopping of the glass plates take place practically at the same time, although the glass plates intended to be picked up by the same upper unit 10 are available almost at the same time.

However, the search for strict similarity of stop times of the different glass plates would complicate the installation. Also to compensate for possible variation which, though slight, exist between each glass plate, and to prevent a glass plate arriving in position from having to wait for the other glass plates intended to be picked up by the same upper unit 10, stopped on the rollers of the conveyor, and being stuck there, the suction means associated with the convexing and/or transfer location under which a glass plate is available are put into action immediately, independent of those associated with the other locations under which glass plates are not yet available. For that purpose, in the supply circuit of the pump(s) (5) associated with that location, the opening of the electric valve, e.g., 25, is controlled, which starts the suction at high level and causes the glass plate first in place to be flattened against the bearing plate, such as 17 or 18, associated with the convexing and/or transfer location in question.

After an instant, a second, then possibly a third glass plate and so on will be picked up by the upper unit.

Each glass plate picked up is then maintained thanks to a vacuum of lower level resulting from closing of the electric valves of type 25 associated with the means of regulating the vacuum of type 23 and from opening of the electric valves of type 26 associated with the means of regulating the vacuum of type 24.

Once all the glass plates are picked up by the upper unit 10, the latter is raised to permit the entry of one or more lower discharge and/or convexing units 11.

The glass plates are then let go or placed simultaneously, or at different instants, on the lower convexing and/or discharge units 11 waiting for them.

Thanks to the pick-up and/or release of the glass plates at instants which can differ from one glass plate to the other, and thanks also to the additional heating, particularly under the glass plates, which can differ from one convexing location to the other, the thermal states of the glass plates which can differ from one glass plate to the other, owing, in particular, to the different lengths of travel to underneath the different convexing and/or transfer locations, may not have any consequences on treatment of the glass plates.

Of course, although the independence of means of suction makes it possible to correct differences in order to make all of the glass plates bent into convex shape at the same time identical, in spite of those differences, notably of thermal state, it also enables the glass plates to be treated differently, with a view to deliberately creating differences between them or to accentuating them, if desired.

Insofar as such differences are not sought, but rather identical glass plates are derived, outlets from the convexing cell to the tempering station or stations are made sideways perpendicular to the longitudinal direction of the installation, so that all the glass plates emanating from the same upper unit 10 following equivalent paths and then simultaneously undergo identical treatments.

Of course, insofar as a differentiation of the glass plates is sought, on the other hand, that differentiation which, as already stated, can be made in heating, can also be made or accentuated in tempering. For that purpose, the tempering means, consisting of boxes and blowing nozzles not represented on the figures, will advantageously be divided into independent zones capable of working, if desired, according to different adjustable conditions. With a view to obtaining such operating flexibility, the blowing means will be mounted in each zone in an adjustable position in relation to the glass plates.

In all cases where such tempering differentiation is not sought, the operating conditions of blowing in the different independent zones will be identically regulated.

The number of independent blowing zones will advantageously correspond to the number of mounting and/or transfer locations provided on the upper unit 10.

The distribution of those zones will advantageously depend on the direction of feed of the glass plates for tempering.

The glass plates will be brought for tempering by one or more carriages equipped with lower discharge and/or convexing units and, in particular, convexing molds consisting of curved-section rings open in the center.

That carriage or those carriages advantageously run on rails 7 placed sideways to the tempering station.

In order to favor the escape of tempering air, the beams of those carriages are advantageously perforated and all the parts comprising them are of reduced size; they are preferably juxtaposed in the tempering plane sideways and outside the blowing zone and are of reduced height.

The invention has been described with a single row of convexing and/or transfer stations on the same upper unit 10.

Of course, two or more parallel rows of convexing and/or transfer stations on the same upper unit 10 are also possible.

The invention describes a tempering of the glass plates following their convexing, but, of course, the glass plates can after convexing undergo a treatment other than tempering, particularly, annealing. The glass plates will preferably be discharged from the convexing station sideways in order to preserve an equivalent path and treatment for said glass plates, to the extent, of course, that this is desired.

Thanks to the invention, the high capacity of convexed and possibly also tempered sheet glass production is not incompatible with a high quality of sheet glass, particularly, with a very great precision in the shape of the sheet glass due to an individualized positioning of each plate and to consideration of the different thermal states of the various glass plates conveyed along different paths.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the bending of glass plates into convex shapes, comprising:

advancing a plurality of glass plates one after the other on a single general conveyor through a furnace to a plurality of stations including at least a bending station, picking up a plurality of said glass plates from the conveyor in the bending station on a single upper unit termed a bending unit if bending occurs thereon, or a transfer unit if no bending occurs thereon, prior to discharge of any one of said picked up glass plates, discharging said pick up glass plates on separate lower units wherein the discharge of each of said picked up plates is independent of the discharge of the other of said picked up plates, wherein when said single upper unit is a transfer unit, said glass plates are bent on said lower units, wherein said glass plates are bent on at least one of said upper unit and said lower units.

2. Process according to claim 1, wherein after bending the glass plates are removed in a direction perpendicular to the direction of feed of the glass plates before bending for subsequent tempering.

3. Process according to claim 1, wherein the upper unit is lifted to let at least one of the lower units enter under the upper unit after pick up of the plurality of glass plates.

4. Process according to claim 1, wherein prior to pick up, the plurality of glass plates arranged under the upper unit are subjected to additional heating differentiated from one glass plate to the next.

* * * * *